US012164993B2

United States Patent
Drzymala et al.

(10) Patent No.: US 12,164,993 B2
(45) Date of Patent: Dec. 10, 2024

(54) INDICIA READERS WITH MULTIPLE IMAGING ASSEMBLIES AND DICHROIC MIRRORS

(71) Applicant: ZEBRA TECHNOLOGIES CORPORATION, Lincolnshire, IL (US)

(72) Inventors: Mark Drzymala, Saint James, NY (US); Edward Barkan, Miller Place, NY (US); Darran Michael Handshaw, Sound Beach, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 48 days.

(21) Appl. No.: 18/139,890

(22) Filed: Apr. 26, 2023

(65) Prior Publication Data
US 2024/0362437 A1 Oct. 31, 2024

(51) Int. Cl.
*G06K 7/10* (2006.01)
*G02B 27/14* (2006.01)

(52) U.S. Cl.
CPC ....... *G06K 7/10722* (2013.01); *G02B 27/141* (2013.01)

(58) Field of Classification Search
CPC .......................... G06K 7/10722; G02B 27/141
USPC ..................................................... 235/462.41
See application file for complete search history.

(56) References Cited

U.S. PATENT DOCUMENTS

2010/0163626 A1* 7/2010 Olmstead ........... G06K 7/10702
235/462.41
2010/0270376 A1* 10/2010 McQueen .......... G06K 7/10722
235/462.11

* cited by examiner

*Primary Examiner* — Toan C Ly
(74) *Attorney, Agent, or Firm* — Yuri Astvatsaturov

(57) ABSTRACT

Indicia readers with multiple imaging assemblies and dichroic mirrors are disclosed herein. In an example, an indicia reader like a barcode reader includes a first (2D) imaging assembly operable to sense light in the 700 nm or below wavelength range, a second (3D) imaging assembly operable to sense light in the above 700 nm wavelength range, and a dichroic mirror. The mirror is situated such that (i) light that is received by the first imaging assembly is received from a product scanning region and is reflected by the mirror such that its path is redirected towards and the first imaging assembly and (ii) light that is received by the second imaging assembly is received from the product scanning region by passing through the mirror toward the second imaging assembly.

20 Claims, 10 Drawing Sheets

INDICIA READERS WITH MULTIPLE IMAGING ASSEMBLIES AND DICHROIC MIRRORS

BACKGROUND

Indicia readers, like barcode readers, are a common occurrence across a wide range of industries. Handheld, stationary, slot, bioptic, and fixed scanners can be found in most places where item tracking is necessary. While the use of these devices is not a new phenomenon, there has been an increased expectation of functional features from these devices, driving the need for improvements in this field, and especially in the ability to effectively package hardware necessary to implement the newly desired features.

SUMMARY

Accordingly, at least some embodiments of the present invention are directed to improved designs associated with the ability to effectively package hardware necessary to implement the newly desired features.

For example, in an embodiment the present invention is an indicia reader, that includes: a housing; a first imaging assembly positioned at least partially within the housing, the first imaging assembly configured to generate first image data representative of a first environment appearing within a field of view (FOV) of the first imaging assembly, the first imaging assembly being one of a two-dimensional (2D) imaging assembly or a three-dimensional (3D) imaging assembly; a second imaging assembly positioned at least partially within the housing, the second imaging assembly configured to generate second image data representative of a second environment appearing within a FOV of the second imaging assembly, the second imaging assembly being another one of the 2D imaging assembly or the 3D imaging assembly; a decode module configured to receive one of the first image data or the second image data resulting in decoder-received image data and process the decoder-received image data to determine a payload of at least one indicium present in the decoder-received image data; a controller communicatively coupled to the decode module and configured to transmit the payload to a host; and a mirror arrangement positioned at least partially within the housing, the mirror arrangement configured to redirect light from a product scanning region of the indicia reader to the first imaging assembly, the mirror arrangement including a dichroic mirror configured to reflect light in a first wavelength range and to pass therethrough light in a second wavelength range, the first wavelength range being different from the second wavelength range, wherein the light in the first wavelength range that is reflected by the dichroic mirror is received, after being reflected by the dichroic mirror, directly or indirectly, by the first imaging assembly and is used to generate the first image data, and wherein the light in the second wavelength range that passes through the dichroic mirror is received, after passing through the dichroic mirror, directly by the second imaging assembly and is used to generate the second image data.

In another embodiment, the present invention is a tangible machine-readable medium comprising instructions that, when executed, cause a machine to at least: generate first image data representative of a first environment appearing within a field of view (FOV) of a first imaging assembly that is positioned at least partially within a housing, the first imaging assembly being one of a two-dimensional (2D) imaging assembly or a three-dimensional (3D) imaging assembly; generate second image data representative of a second environment appearing within a FOV of a second imaging assembly that is positioned at least partially within the housing, the second imaging assembly being another one of the 2D imaging assembly or the 3D imaging assembly; receive, at a decode module, one of the first image data or the second image data resulting in decoder-received image data and process the decoder-received image data to determine a payload of at least one indicium present in the decoder-received image data; transmit, via a controller communicatively coupled to the decoder module, the payload to a host; wherein the machine includes a mirror arrangement positioned at least partially within the housing, the mirror arrangement configured to redirect light from a product scanning region of the machine to the first imaging assembly, the mirror arrangement including a dichroic mirror configured to reflect light in a first wavelength range and to pass therethrough light in a second wavelength range, the first wavelength range being different from the second wavelength range, wherein the light in the first wavelength range that is reflected by the dichroic mirror is received, after being reflected by the dichroic mirror, directly or indirectly, by the first imaging assembly and is used to generate the first image data, and wherein the light in the second wavelength range that passes through the dichroic mirror is received, after passing through the dichroic mirror, directly by the second imaging assembly and is used to generate the second image data.

In yet another embodiment, the present invention is an indicia reader, comprising: a housing; a first imaging assembly positioned at least partially within the housing, the first imaging assembly configured to generate first image data representative of a first environment appearing within a field of view (FOV) of the first imaging assembly, the first imaging assembly being one of a two-dimensional (2D) imaging assembly or a three-dimensional (3D) imaging assembly; a second imaging assembly positioned at least partially within the housing, the second imaging assembly configured to generate second image data representative of a second environment appearing within a FOV of the second imaging assembly, the second imaging assembly being another one of the 2D imaging assembly or the 3D imaging assembly; a printed circuit board having the first imaging assembly and the second imaging assembly mounted thereon; a decode module configured to receive one of the first image data or the second image data resulting in decoder-received image data and process the decoder-received image data to determine a payload of at least one indicium present in the decoder-received image data; a controller communicatively coupled to the decoder module and configured to transmit the payload to a host; and a mirror arrangement positioned at least partially within the housing, the mirror arrangement having a first mirror and a second mirror, the first mirror being a dichroic mirror and configured to pass therethrough light in a first wavelength range and to reflect light in a second wavelength range, the second mirror being configured to reflect light in the second wavelength range, wherein the mirror arrangement is configured to redirect light from a product scanning region of the indicia reader to the first imaging assembly and the second imaging assembly by: receiving, at the first mirror, light along a first path within the first wavelength range and the second wavelength range; passing, through the first mirror, a first portion of the light received at the first mirror toward the first imaging assembly, the first portion of the light received at the first mirror being limited to light within the first wavelength range; reflecting, by the first mirror, a second portion of light received at the first mirror toward the second mirror, the second portion of the light received at the first mirror being limited to light within the second wavelength range; and reflecting, by the second mirror, the second portion of light toward the second imaging assembly.

In still yet another embodiment, the present invention is an indicia reader, comprising; a housing; a first imaging assembly positioned at least partially within the housing, the first imaging assembly configured to generate first image data representative of a first environment appearing within a field of view (FOV) of the first imaging assembly, the first imaging assembly being one of a two-dimensional (2D) imaging assembly or a three-dimensional (3D) imaging assembly; a second imaging assembly positioned at least partially within the housing, the second imaging assembly configured to generate second image data representative of a second environment appearing within a FOV of the second imaging assembly, the second imaging assembly being another one of the 2D imaging assembly or the 3D imaging assembly; a printed circuit board having the first imaging assembly and the second imaging assembly mounted thereon; a decode module configured to receive one of the first image data or the second image data resulting in decoder-received image data and process the decoder-received image data to determine a payload of at least one indicium present in the decoder-received image data; a controller communicatively coupled to the decode module and configured to transmit the payload to a host; and a mirror arrangement positioned at least partially within the housing, the mirror arrangement having a first mirror and a second mirror, the first mirror being a dichroic mirror and configured to reflect light in a first wavelength range and to pass therethrough light in a second wavelength range, the second mirror being configured to reflect light in the second wavelength range, wherein the mirror arrangement is configured to redirect light from a product scanning region of the indicia reader to the first imaging assembly and the second imaging assembly by: receiving, at the first mirror, light along a first path within the first wavelength range and the second wavelength range; reflecting, by the first mirror, a first portion of light received at the first mirror toward the first imaging assembly, the first portion of the light received at the first mirror being limited to light within the first wavelength range; and passing, through the first mirror, a second portion of the light received at the first mirror toward the second mirror, the second portion of the light received at the first mirror being limited to light within the second wavelength range; reflecting, by the second mirror, the second portion of light toward the second imaging assembly.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
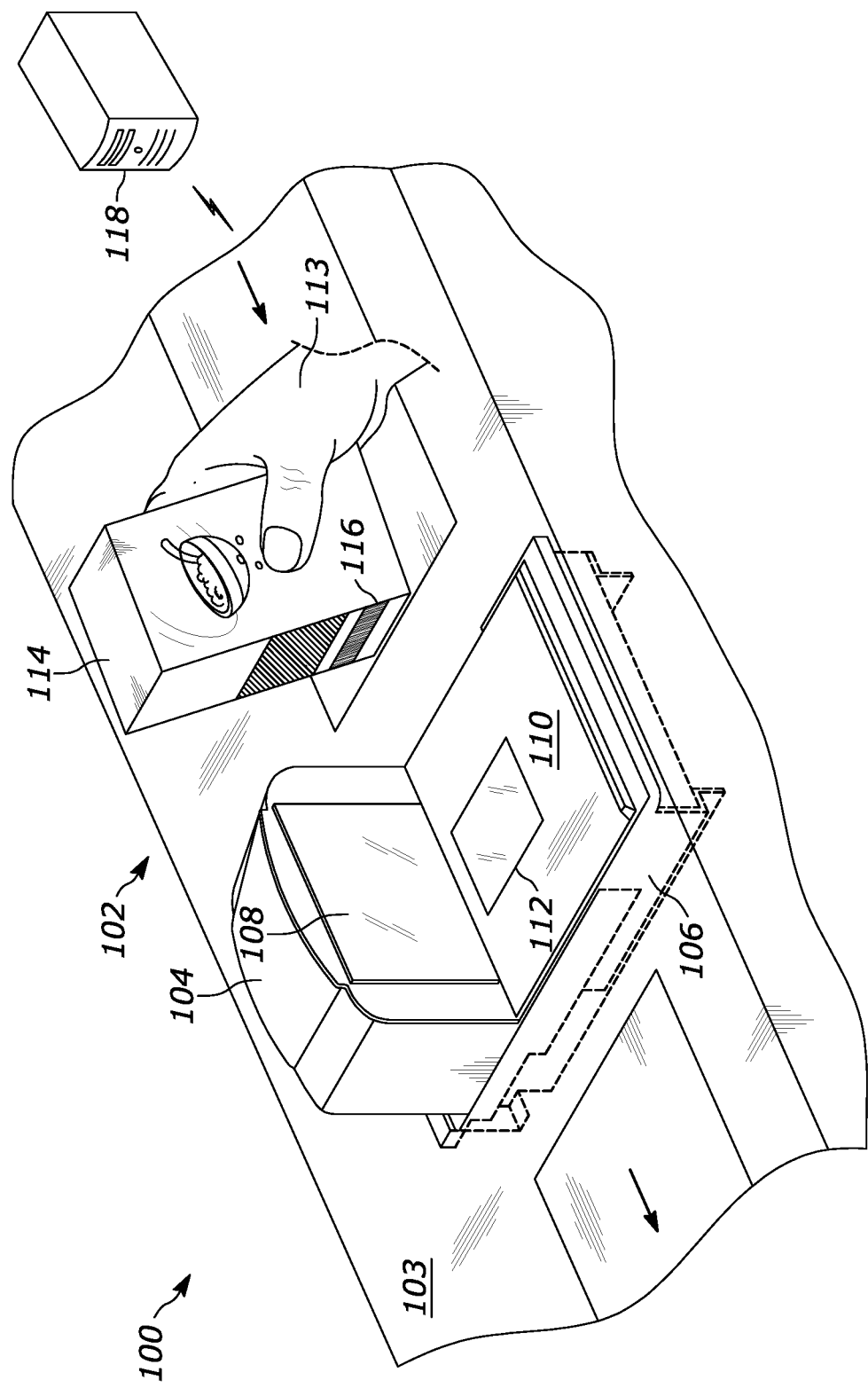
FIG. 1 is a perspective view of an example indicia reader that may be used to implement inventive concepts described here.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

As used herein, the term "indicia" should be understood to refer to any kind of visual marker that can be associated with an item or a transaction. For example, indicia can be a 1D, 2D, or 3D barcode, a graphic, a logo, etc. Additionally, indicia may comprise encoded payload data as, for example, is the case with a 1D or 2D barcode where the barcode encodes a payload comprised of, for example, alphanumeric or special characters that may be formed into a string.

It has been recognized that due to the continued need for the expansion of functional features of indicia readers, there is now a need to include three-dimensional (3D) cameras (also referred to as depth cameras/imagers/imaging assemblies) together with two-dimensional (2D) cameras (also referred to as polychromatic or monochromatic cameras/imagers/imaging assemblies) within the indicia reader. While valuable data may be gained from the use of 3D cameras, the implementation of packaging these assemblies together in an effective manner creates significant challenges that the current disclosure addresses.

At a higher level, embodiments described herein may be used in any variety of indicia readers. For example, FIG. 1 illustrates an exemplary bioptic indicia reader that may be used in a retail venue, where said reader may employ the concepts described herein. In the illustrated example, the bioptic indicia reader 100 is shown as part of a point-of-sale (POS) system arrangement 102 having the bioptic indicia reader 100 positioned within a workstation counter 103. Generally, the indicia reader 100 includes an upper housing 104 (also referred to as an upper portion, upper housing portion, or tower portion) and a lower housing 106 (also referred to as a lower portion, lower housing portion, or platter portion). The upper housing 104 can be characterized by an optically transmissive window 108 positioned therein along a generally vertical plane and one or more field of view (FOV) which passes through the window 108 and extends in a generally lateral direction. The lower housing 106 can be characterized by a weigh platter 110 or a cover that includes an optically transmissive window 112 positioned therein along a generally horizontal (also referred to as a transverse) plane and one or more FOV which passes through the window 112 and extends in a generally upward direction. The weigh platter 110 is a part of a weigh platter assembly that generally includes the weigh platter 110 and a scale (or load cell) configured to measure the weight of an object placed the top surface of the weight platter 110. By that virtue, the top surface of the weight platter 110 may be considered to be the top surface of the lower housing 106 that faces a product scanning region there above.

In operation, a user 113 generally passes an item 114 across a product scanning region of the indicia reader 100 in a swiping motion in some general direction, which in the illustrated example is right-to-left. A product scanning region can be generally viewed as a region that extends above the platter 110 and/or in front of the window 108 where barcode reader 100 is operable to capture image data of sufficient quality to perform imaging-based operations like decoding a barcode that appears in the obtained image data. It should be appreciated that while items may be swiped past the indicia reader 100 in either direction, items may also be presented into the product scanning region by means other than swiping past the window(s). When the item 114 comes into the any of the fields of view of the reader, the indicia 116 on the item 114 is captured and decoded by the indicia reader 100, and corresponding data (e.g., the payload of the indicia) is transmitted to a communicatively coupled host 118 (commonly comprised of a point of sale (POS) terminal).

Figure 2:
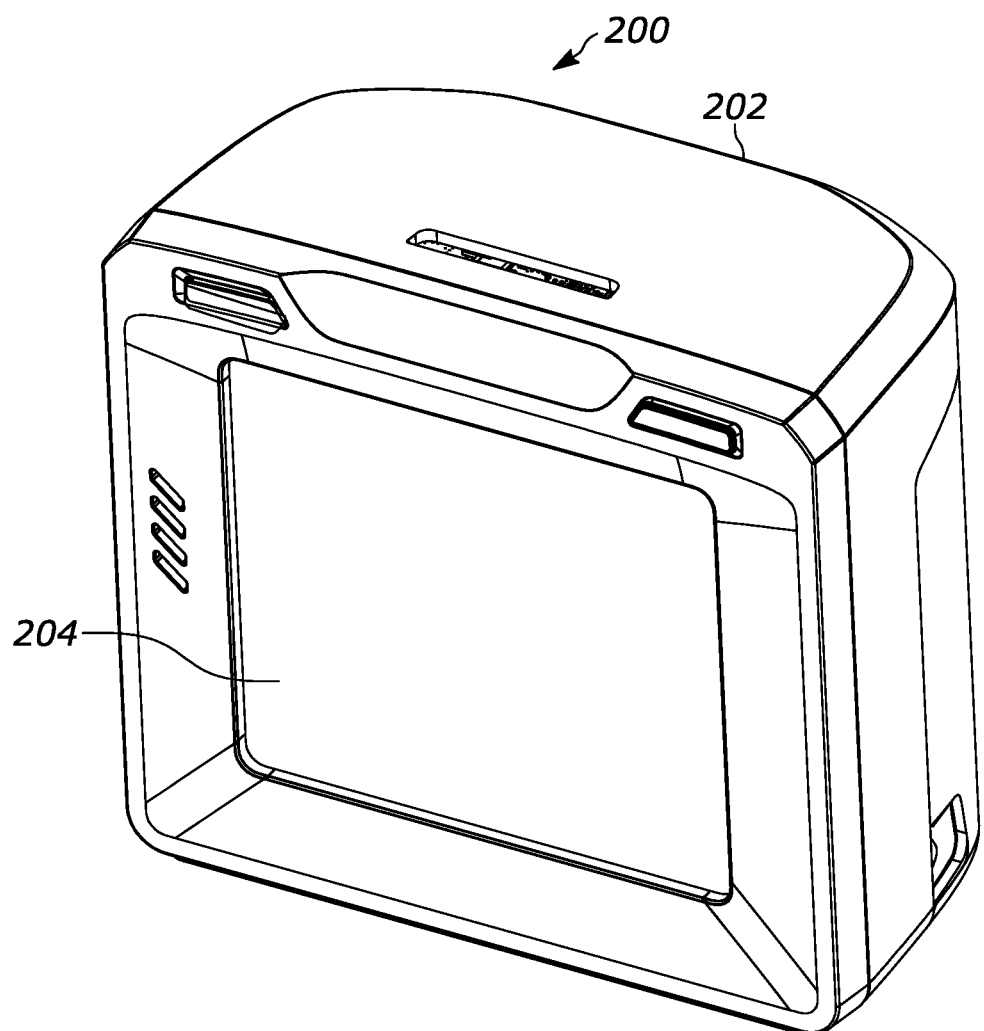
FIG. 2 is a perspective view of another example barcode reader that may be used to implement inventive concepts described here.

FIG. 2 illustrates another example of an indicia reader, sometimes referred to as a slot scanner. In the example shown, indicia reader 200 has a housing 202 and a window 204, which faces a product scanning region, to allow a set of optical components positioned within housing 202 to direct at least one field-of-view through window 204. Indicia reader 200 operates on a similar principle as the reader 100 of FIG. 1. However, it is generally smaller (typically having a window that is smaller than 5 inches across), includes a single window, and, while it could be installed in a slot of a counter (functioning like the bottom portion of the reader 100), it can also be used as a stationary scanner positioned on a working surface (functioning like the upper portion of the reader 100).

Figure 3:
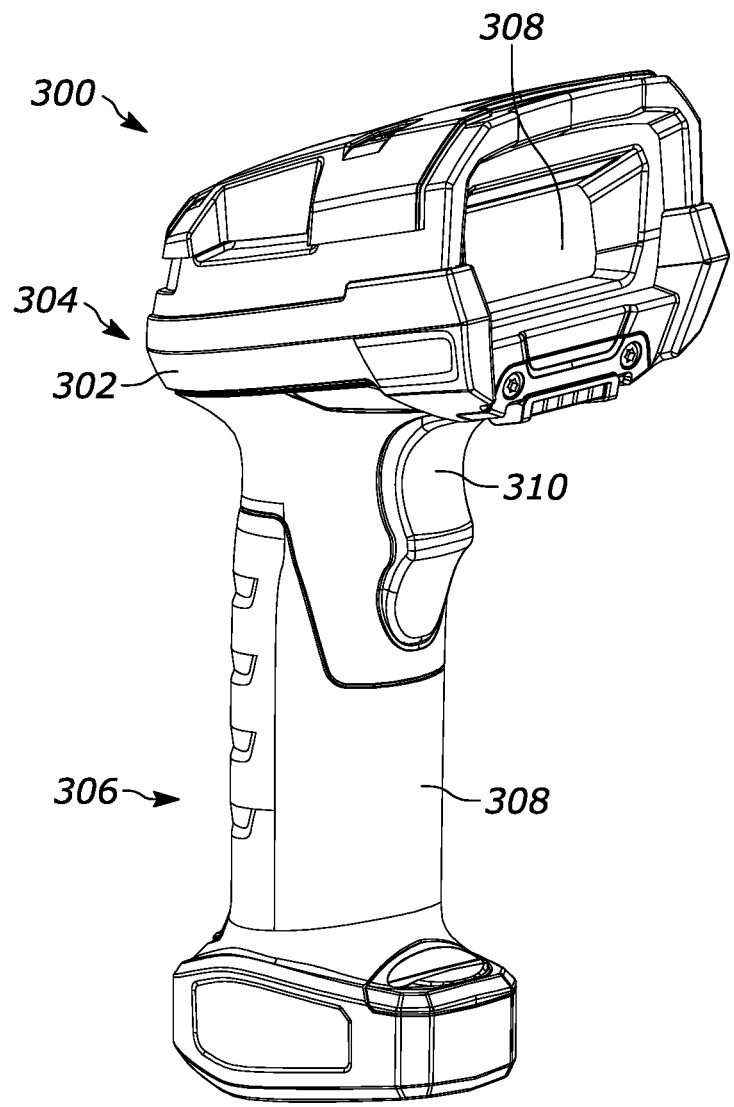
FIG. 3 is a perspective view of another example barcode reader that may be used to implement inventive concepts described here.

FIG. 3 illustrates yet another example of an indicia reader 300, sometimes referred to as a handheld indicia reader. Reader 300 generally includes a housing 302 that is comprised of a head portion 304 and a bottom portion 306. The head portion 304 houses at least some optoelectrical components for capturing relevant image data along a FOV that extends through a window 308. The bottom portion 306 typically includes a handle portion 308 and a trigger 310. In operation, a user typically grasps the handle portion 308 and points the reader 300 in a general direction of the indicia that is to be read. If the reader is configured to be activated with the activation of the trigger 310, subsequent to the user squeezing the trigger 310, reader 300 captures relevant image data and processes it accordingly.

While it will be appreciated that concepts described herein may be used in connection with any of the indicia reader embodiments described above, this should not be considered limiting and it should be understood that other form factors of indicia readers could be employed.

As noted previously, a need for using multiple imaging assemblies within indicia readers has been identified. In some applications, there is a particular need for combining 2D and 3D imaging assemblies within an indicia reader. To address this, the present disclosure presents novel concepts which leverage the use of one or more dichroic mirrors positioned within optical paths of certain imaging assemblies.

Figure 4:
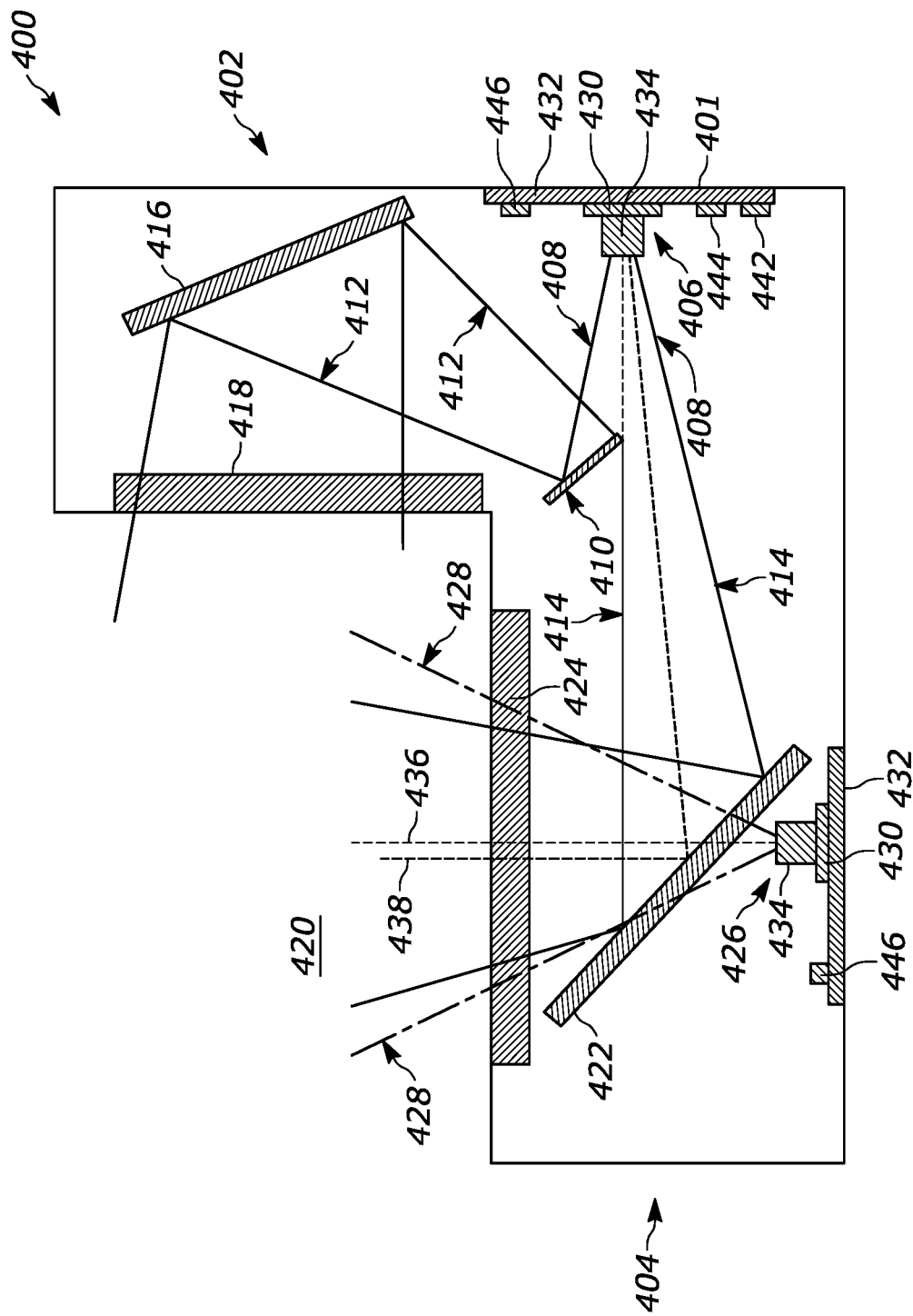
FIG. 4 illustrates a side cross-section block diagram of an example bioptic indicia reader having a dichroic mirror positioned in a bottom portion thereof.
Figure 5:
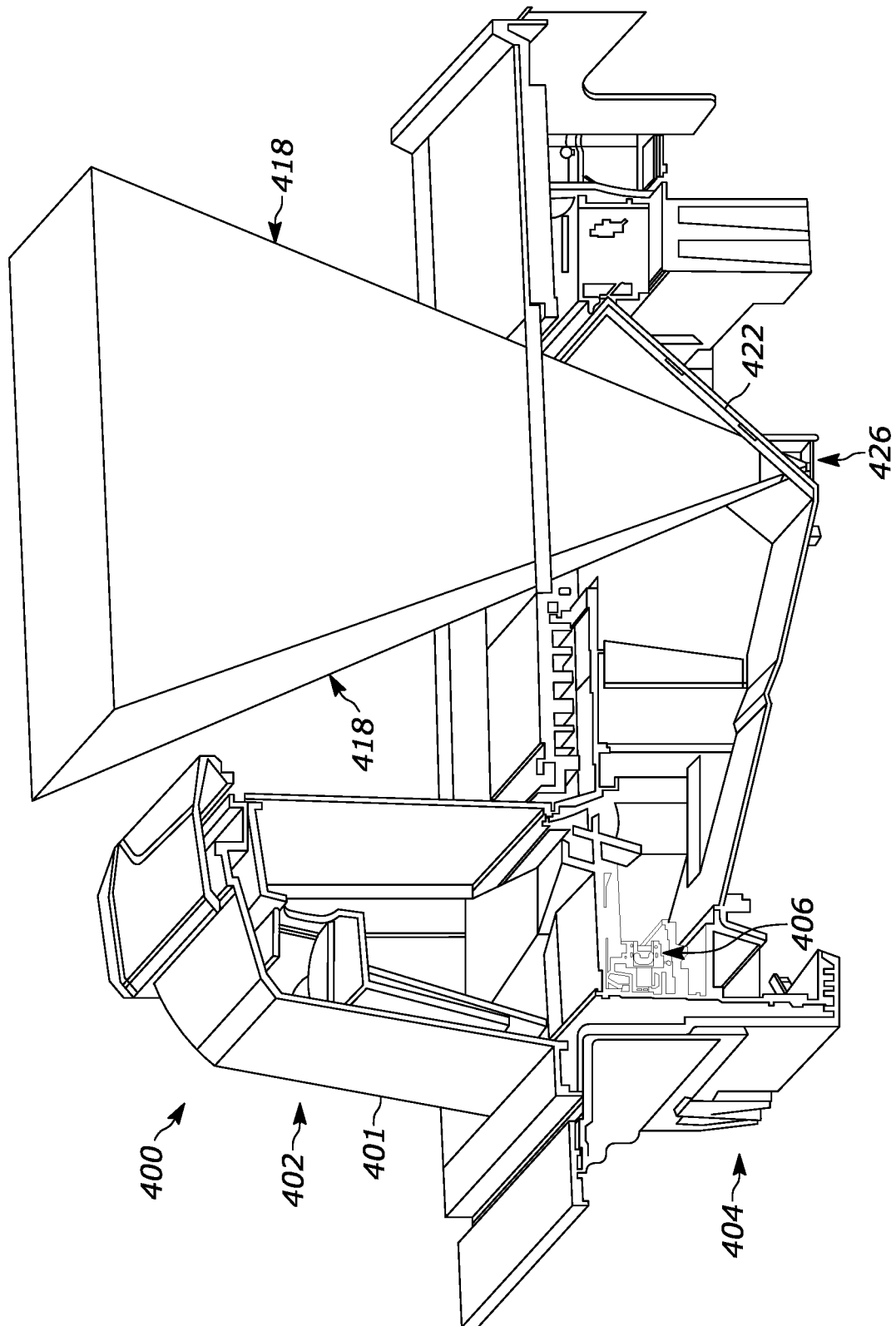
FIG. 5 illustrates a perspective cross-section of the indicia reader of FIG. 4.

Referring to FIGS. 4 and 5, shown therein (with FIG. 4 illustrating a side cross-section block diagram and FIG. 5 illustrating a perspective cross-section) is an example bioptic indicia reader 400 which utilizes a dichroic mirror in the bottom portion thereof. More specifically, the reader 400 includes a housing 401 with an upper portion 402 and a bottom portion 404. Positioned at least partially within the bottom portion 404 is a first imaging assembly 406 which, in the illustrated example, is an imaging assembly operable to generate 2D image data.

A 2D imaging assembly may include an image sensor (also referred to as an imager or imaging sensor) that can be, for example, a two-dimensional CCD or a CMOS sensor that can be either a monochrome sensor or a color sensor having, for instance 1.2 megapixels arranged in a 1200×960 pixel configuration. It should be appreciated that sensors having other pixel-counts (both below and above) are within the scope of this disclosure. These two-dimensional sensors generally include mutually orthogonal rows and columns of photosensitive pixel elements arranged to form a substantially flat square or rectangular surface. Such imagers are operative to detect light captured by an imaging lens assembly along a respective optical path or axis that normally traverses through either of the generally horizontal or generally upright window(s) with the assistance of one or more splitter and/or fold mirrors (also referred to as a mirror arrangement). In instances where multiple imaging assemblies are used, each respective imager and imaging lens assembly pair is designed to operate together for capturing light scattered, reflected, or emitted from indicia as pixel data over a respective FOV. In other instances, a single imaging assembly may be used to generate a single primary FOV which may be split, divided, and/or folded to generate multiple FOVs by way of the mirror arrangement. In such cases, data collected from various portions of the imaging sensor may be evaluated as if it was obtained by an individual imaging assembly/imaging sensor.

As illustrated, the first imaging assembly 406 has associated therewith a primary FOV 408 that is partially split via a splitter mirror 410 into a first sub-FOV 412 and a second sub-FOV 414. The first sub-FOV 412 is directed, via the splitter mirror 410, in a generally upward direction into the upper portion 402, where it is then reflected by a fold mirror 416 such that the path of the first sub-FOV is directed through the window of 418 of the upper option 402 into the product scanning region 420 of the reader 400 along a generally lateral direction. It should be appreciated that a generally lateral direction of a FOV shall include a FOV whose central imaging axis is within +/−40 degrees of a horizontal plane (e.g., a plane defined by the platter window). The second sub-FOV 414 is formed after the first sub-FOV is split and redirected away from and the primary FOV 408. It continues unimpeded within the bottom portion 404 of the reader 400 until it is redirected, by fold mirror 422, in a generally upward direction such that it passes through the window 424 of the bottom portion 404 into the product scanning region 420. It should be appreciated that a generally upward direction of a FOV shall include a FOV whose central imaging axis is within +/−40 degrees of a vertical plane (e.g., a plane that is normal to the platter window).

It should also be appreciated that while a specific splitter/fold mirror arrangement has been provided, this is merely exemplary and other mirror arrangements are within the scope of the present disclosure. Similarly, illustrations of the various FOVs are provided as examples and the specific number of, directionality, orientation, angle of divergence, etc., may all be varied based on the desired applications of the inventive concepts described herein. For example, splitter mirror 410 may be a concave or a convex divider/splitter mirror creating two second sob-FOVs when are then directed to their respective mirrors within the upper portion of the reader. Additionally, the positioning and orientation of the imaging assembly 406 need not be seen as limiting and it may similarly be varied based on the applications of the concepts descried herein. Additionally, it should be appreciated that references to the term "FOV" as used herein may refer to the primary FOV, any one or more of the sub-FOVs, a collective of all sub-FOVs emanating from a single primary FOV, or a collective of all sub-FOVs emanating from a plurality of sub-FOVs.

As a result of the foregoing mirror arrangement, at least some light traveling from the product scanning region 420 along the first sub-FOV 412 and the second sub FOV 414 is received by the first imaging assembly 406, where it is sensed by the respective imaging sensor to generate image data. In a preferred embodiment, the 2D imaging assembly 406 is operable to sense light in a particular wavelength range like, for example, visible light in the 700 nm or less wavelength range. To allow light in that range to be received the imaging assembly 700, mirrors 410, 416, 422 of the mirror arrangement of reader 400 are operative to reflect light in the wavelength range of the imaging assembly 406 (e.g., 700 nm or less). Image data received by the imaging assembly 406 may be used for a variety of machine vision purposes, including, but not limited to, barcode decoding, item tracking or analysis, object detection and any other relevant machine vision operations. It should be apparent that other wavelength ranges are well within the scope of the subject disclosure.

Further to the first imaging assembly 406, the indicia reader houses a second imaging assembly 426, at least partially housed in the bottom portion 404. The imaging assembly 426 is positioned at least partially under the fold mirror 422 and is operable to receive light over a respective FOV 428 from the product scanning region 420. To enable light from the product scanning region 420 to reach the imaging assembly 426 and not be reflected by the fold mirror 422, the fold mirror 422 is implemented as a dichroic mirror that reflects light in one wavelength range and allows light in a different wavelength range to pass therethrough. Generally, a dichroic mirror can be made using one or more of: a coating applied to a conventional mirror, film applied to a conventional mirror, or a mirror comprising colored glass. In this case, the imaging assembly 426 and the dichroic fold mirror 422 should be selected such that light that is passed through the mirror 422 can be sensed by the imaging assembly 426 such that the imaging assembly 426 can generate respective image data based on the sensed light. In the currently described embodiment, the mirror 422 may be configured to allow light that is in a wavelength range of greater than 700 nm to pass therethrough and to reach the imaging assembly 426. However, it should be apparent that other ranges are well within the scope of the subject disclosure.

In the currently described embodiment, the imaging assembly is a 3D imaging assembly operable to generate 3D image data like, for example, a point cloud. In general, when the imaging assemblies of the present disclosure are implemented as 3D imaging assemblies, they may include, for example, stereoscopic vision assemblies, structured light vision assemblies, or time-of-flight (ToF) vision assemblies, and can be implemented as assemblies that sense light in, for example, the greater than 700 nm wavelength range. It will be understood that each embodiment of an imaging assembly (2D and 3D) includes necessary hardware components to enable appropriate image capture over a certain FOV. As such, these imaging assemblies will generally include a sensor 430 for sensing light, a substrate 432 on which the sensor is mounted, and optics 434 (typically secured to the substrate with a chassis) that focus light onto the sensor over a certain FOV. In some embodiments, the 3D imaging assembly 426 includes a ToF sensor operable to sense light in the 1350 nm to 1450 nm wavelength range. In some other embodiments, the 3D imaging assembly 426 includes a ToF sensor operable to sense light in the greater than 900 nm wavelength range.

With the example mirror arrangement of FIGS. 4 and 5, light in the 700 nm or less wavelength range traveling along the first and second sub-FOVs 412 and 414 from the product scanning region 420 is reflected by the mirrors 410, 416, and 422 such that it reaches the imaging assembly 406 and is registered as 2D image data. Conversely, light in the greater than 700 nm wavelength range passes through the mirror 422 and reaches the imaging assembly 426 where it is registered as 3D image data.

Positioning the second imaging assembly 426 under the fold mirror 422 allows for increased versatility of the 3D image data that is received therefrom. This is because the FOV 428 produced thereby can be oriented in a coordinated fashion with the 2D second sub-FOV 414. For example, the central imaging axis 436 of the FOV 428 and the central imaging axis 438 of the second sub-FOV 414 may be substantially coaxial. As used herein, substantially coaxial shall mean that the central axes are within a distance of 1 inch of each other as they pass through the platter window 424 and are angled less than 25 degrees relative to each other. However, other (not necessarily overlapping or substantially coaxial) orientations of the FOV 428 and second sub-FOV 414 are also within the scope of the present disclosure and can vary with differing applications.

The aforementioned increased versatility comes from the fact that 2D image data and 3D image data may often (but not always) need to be used together to render various operations. For example, the 2D image data can be transmitted to a decode module 442 where it is processed to decode one or more indicia (e.g., barcode) present therein, extracting the respective payload (which may then be transmitted by a controller 444 to a downstream/upstream host). This payload data can serve as an item identifier whereby one could expect the item the appearing in the product scanning region and bearing the decoded indicia to be a specific item. This information may be used for verification purposes where the 3D characteristics of an item appearing in the product scanning region are compared against the expected item. If there is a sufficient match in the characteristics, that can be interpreted as a successful item verification. On the other hand, if there is a sufficient mismatch, then further action may be taken (e.g., triggering a mitigation action in response to a potential shrink event). In other cases, the 3D image data may be used for other purposes like, for example: detecting an item coming into the product scanning region and activating the reader to switch from a reduced operation mode (e.g., sleep mode) to a full operation mode; limiting which barcodes are decoded based on whether the item bearing the barcode appears within the product scanning region, as determined by the 3D image data; or identifying visual features in the 2D data based on the location of an item in the 3D data. Notably, having the 2D image data and the 3D image data capture a substantially similar view of the item being presented can (in some cases significantly) reduce the complexity of performing such operations. For instance, where the 2D FOV and the 3D FOV are matched, there is a one-to-one match in terms of feature position. Thus, if an item of interest is detected at a given horizontal and vertical position in the 3D image data, those coordinates can directly translate to the 2D image data allowing for easier item identification in the 2D image data without the need for remapping of coordinates from the 3D FOV to a 2D FOV.

Figure 6:
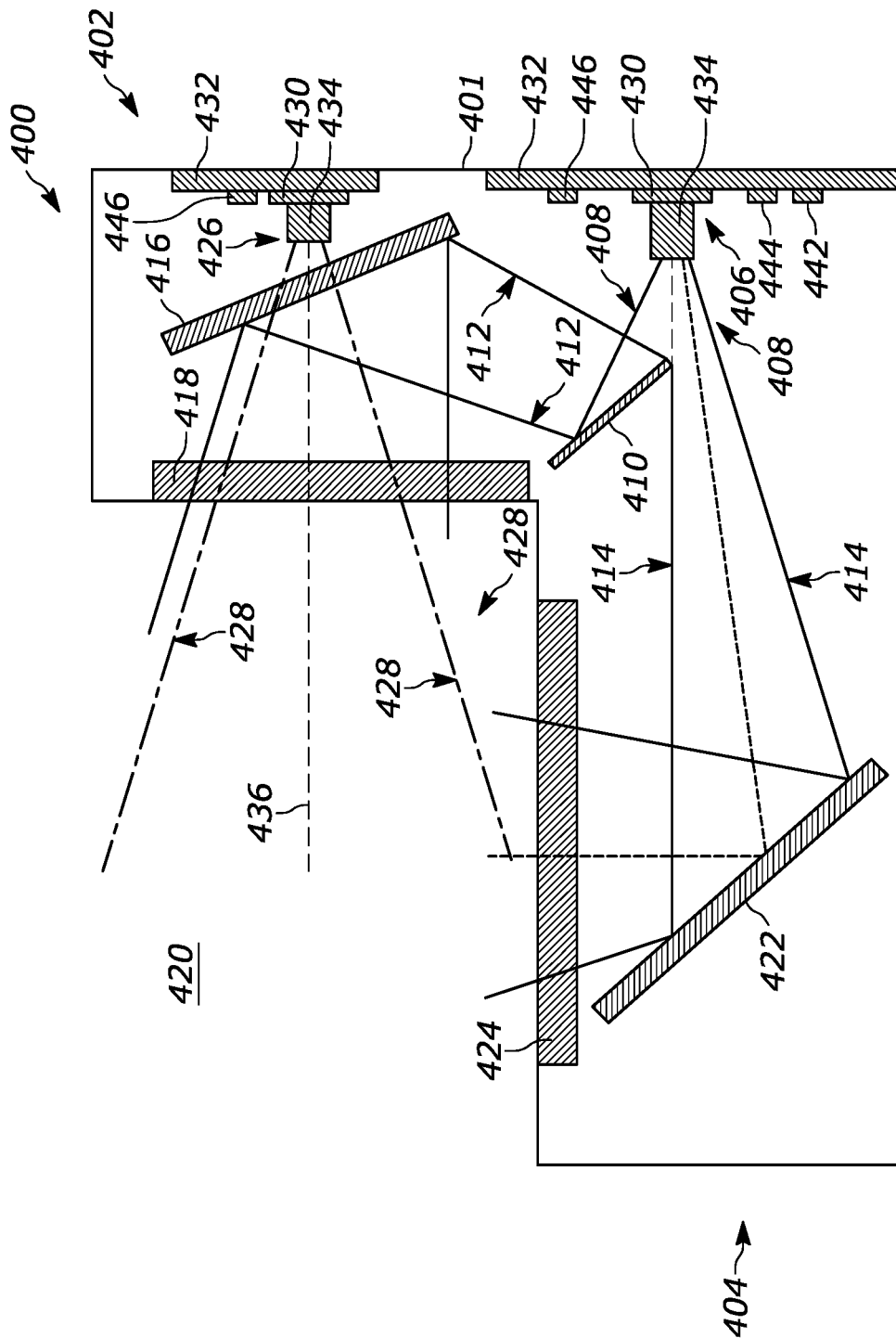
FIG. 6 illustrates a side cross-section block diagram of another example bioptic indicia reader having a dichroic mirror positioned in an upper portion thereof.
Figure 7:
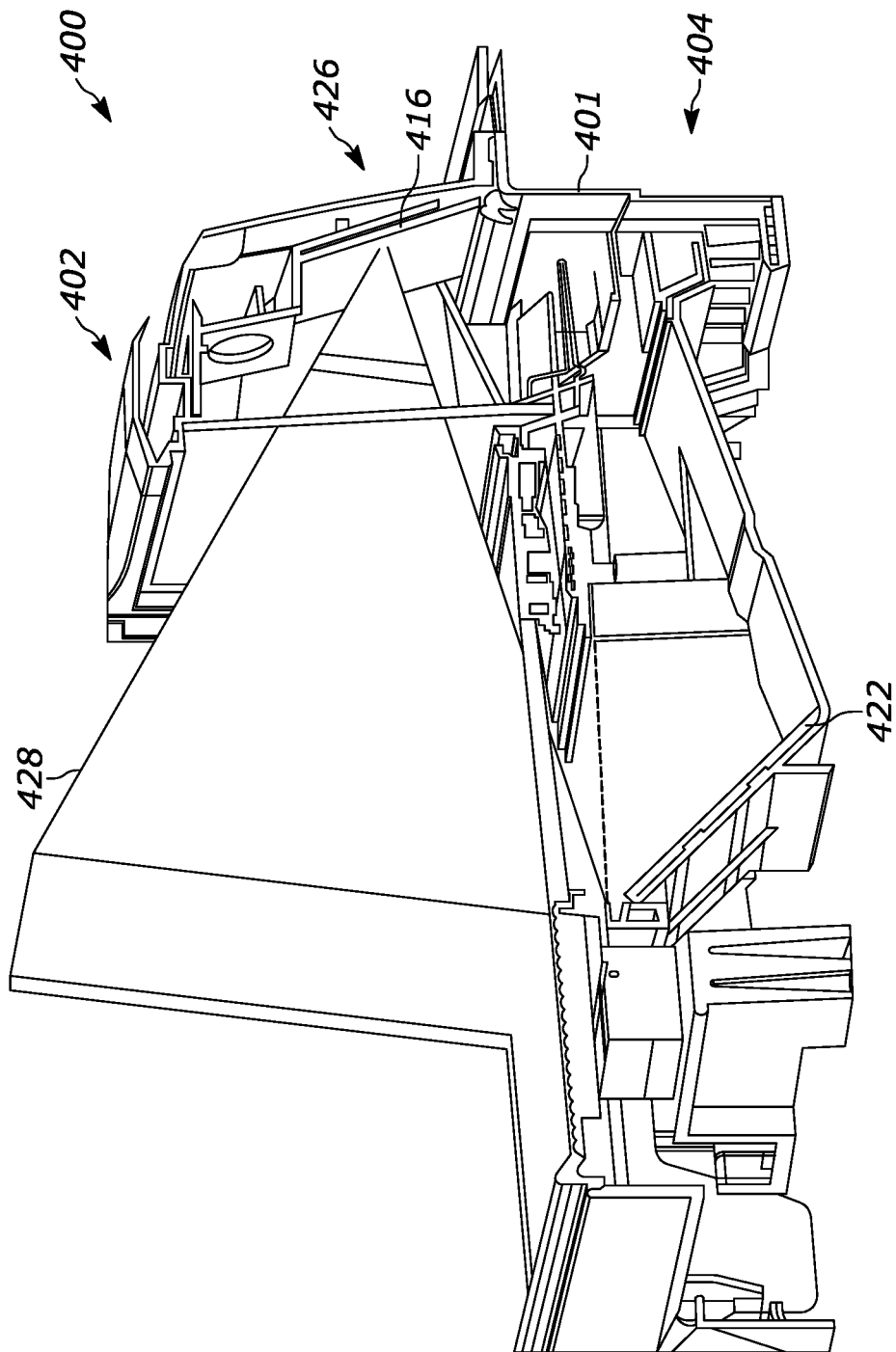
FIG. 7 illustrates a perspective cross-section of the indicia reader of FIG. 6.

An alternate embodiment of an indicia reader is illustrated in FIGS. 6 and 7 where similar elements to those shown in FIGS. 4 and 5 use the same reference numerals. In this embodiment, rather than being positioned below the bottom fold mirror 422, the second imaging assembly 426 is positioned at least partially behind the upper fold mirror 416. Given this configuration, to enable imaging assembly 426 to receive light from the product scanning region 420 and along the FOV 428, mirror 416 should be implemented as a dichroic mirror. One of ordinary skill in the art will appreciate that the mirror 416 may be configured in the same way as the previously described mirror 422, allowing light within a predetermined wavelength (e.g., 700 nm or below) to be reflected along the first sub-FOV 412 towards the first imaging assembly 406 and allowing light within another predetermined wavelength (e.g., above 700 nm) to be passed therethrough allowing said light to reach the imaging assembly 426. In this case, the FOV 428 of the second imaging assembly is directed in a generally lateral direction toward the product scanning region and passes through the upper housing's transparent window that is positioned in a generally upright plane.

Although two distinct exemplary embodiments have been demonstrated in FIGS. 4-7, it should be understood that other imaging assembly/mirror arrangements are within the scope of the present disclosure and that at least some embodiments may have other configurations so long as at least two imaging assemblies, each operable in a respective wavelength range, receive light such that one of those assemblies receives light by way of light reflecting off of a dichroic mirror and the other of those assemblies receives light by way of light passing through the dichroic mirror. As such, a variety of different mirror arrangements and imaging assembly arrangements may be within the scope of the present disclosure. For example, one may position the second imaging assembly behind the mirror 410 with the mirror 410 being dichroic and mirror 416 being configured to reflect light in the wavelength range of both imaging assemblies 406 and 426.

Additionally, while the embodiments have been described with the first imaging assembly being a 2D imaging assembly and the second imaging assembly being a 3D imaging assembly, that may be reversed, and the first imaging assembly may be a 3D imaging assembly and the second imaging assembly may be a 2D imaging assembly. It should be appreciated that in such an event, the appropriate dichroic mirror would need to be utilized so as to allow light of appropriate wavelength for the assembly positioned behind the mirror to pass through the mirror and to allow light of appropriate wavelength for the assembly receiving light reflected from the mirror to be reflected off of the mirror to reach that assembly.

It should also be noted that while both embodiments demonstrated only one mirror being a dichroic mirror and only said one dichroic mirror having a second imaging assembly positioned therebehind, other embodiments may increase those numbers such that multiple dichroic mirrors and multiple second imaging assemblies may be implemented. For example, there may an embodiment that combines both the configurations of FIGS. 4-5 and FIGS. 6-7 such that both mirrors 416 and 422 are dichroic mirrors with each of those mirrors having a respective second imaging assembly 426 positioned therebehind.

Additionally, it should be noted that reader 400 may include other components like illumination assemblies 446 for illuminating respective FOVs and communication ports for communicating with one or more external hosts.

Figure 8:
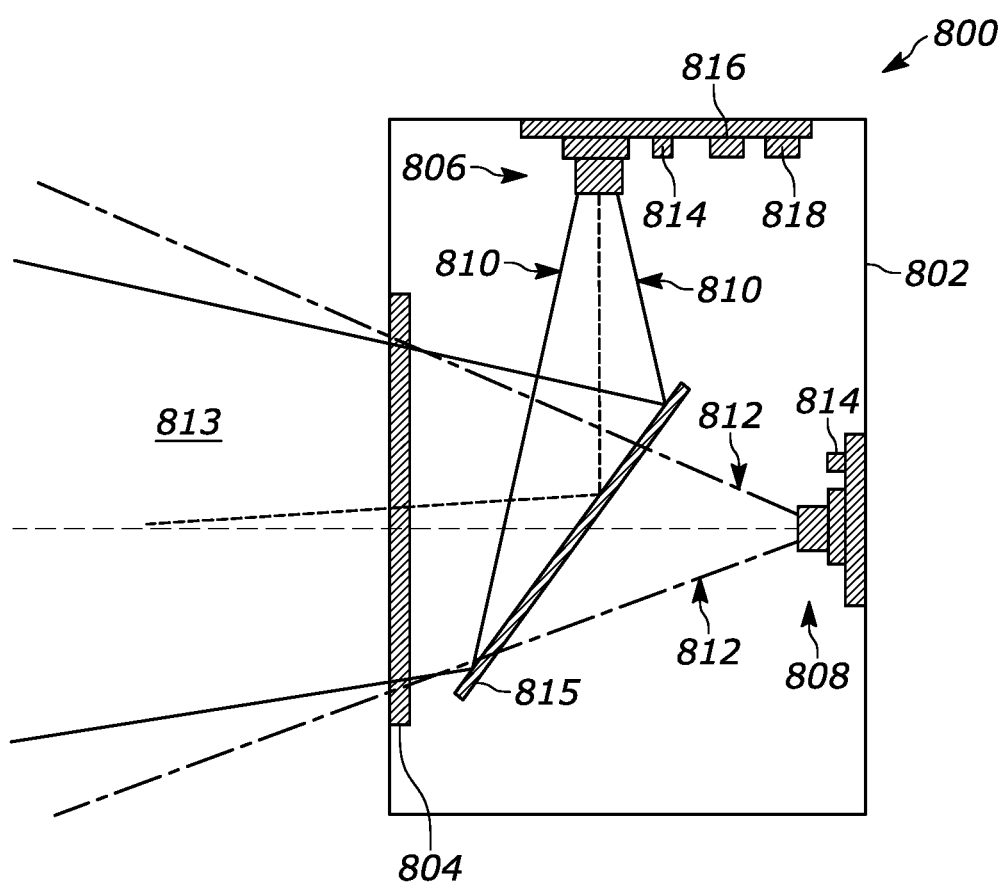
FIG. 8 illustrates a side cross-section block diagram of an example slot indicia reader having a dichroic mirror positioned therein.

Referring now to FIG. 8, shown therein is an example indicia reader 800 having a form factor that is similar to that of the slot scanner shown in FIG. 2. The indicia reader 800 has a housing 802 with a transparent window 804. As described in connection with the reader of FIG. 2, indicia reader 800 may be oriented in a generally upright orientation to image items presented in front of the reader or it may be oriented in a generally horizontal orientation to image items presented above the reader. In any case, the reader 800 includes a first imaging assembly 806 and a second imaging assembly 808. Both the first imaging assembly 806 and the second imaging assembly 808 may, respectively, be configured similarly to the first imaging assembly 406 and second imaging assembly 426 of the embodiments of FIGS. 4-7. Thus, the first imaging assembly 806 may be operable as a 2D imaging assembly with a FOV 810 and the second imaging assembly 808 may be configured as a 3D imaging assembly with a FOV 812. Alternatively, the arrangement may be reversed where the first imaging assembly 806 is a 3D imaging assembly and the second imaging assembly is a 2D imaging assembly.

To enable the first imaging assembly 806 and the second imaging assembly 808 to receive light over respective FOVs 810, 812 from a product scanning region 813, a dichroic mirror 815 is positioned within the reader 800. Specifically, it is oriented such that light within a wavelength that is able to be sensed by the first imaging assembly 806 is reflected thereby and that light within a wavelength that is able to be sensed by the second imaging assembly 806 is propagated therethrough. In a preferred embodiment, the dichroic mirror reflects light in the wavelength range at or below 700 nm and passes light therethrough in the wavelength range above 700 nm. However, as with the prior embodiment, other ranges are within the scope of the present disclose.

While in the currently described embodiment the dichroic mirror is the only mirror of the reader, as with the previous embodiments, the reader 800 may include illumination assemblies 814, a decoder module 816, controller 818, and a communication port (or wireless radio) for communicating with an external host. It should be appreciated that reader 800, while being structurally different from that of the embodiments of FIGS. 4-7, may operate in a manner that is functionally same or similar to the reader 400 of embodiments of FIGS. 4-7. Additionally, the specific orientation of the FOVs 810 and 812 should be seen as exemplary and it should be understood that the imaging assemblies and the mirror 815 may be oriented in any desired manner so long as light received by the first imaging assembly 806 is reflected off the mirror 815 and light received by the second imaging assembly passes through the mirror 815.

Figure 9:
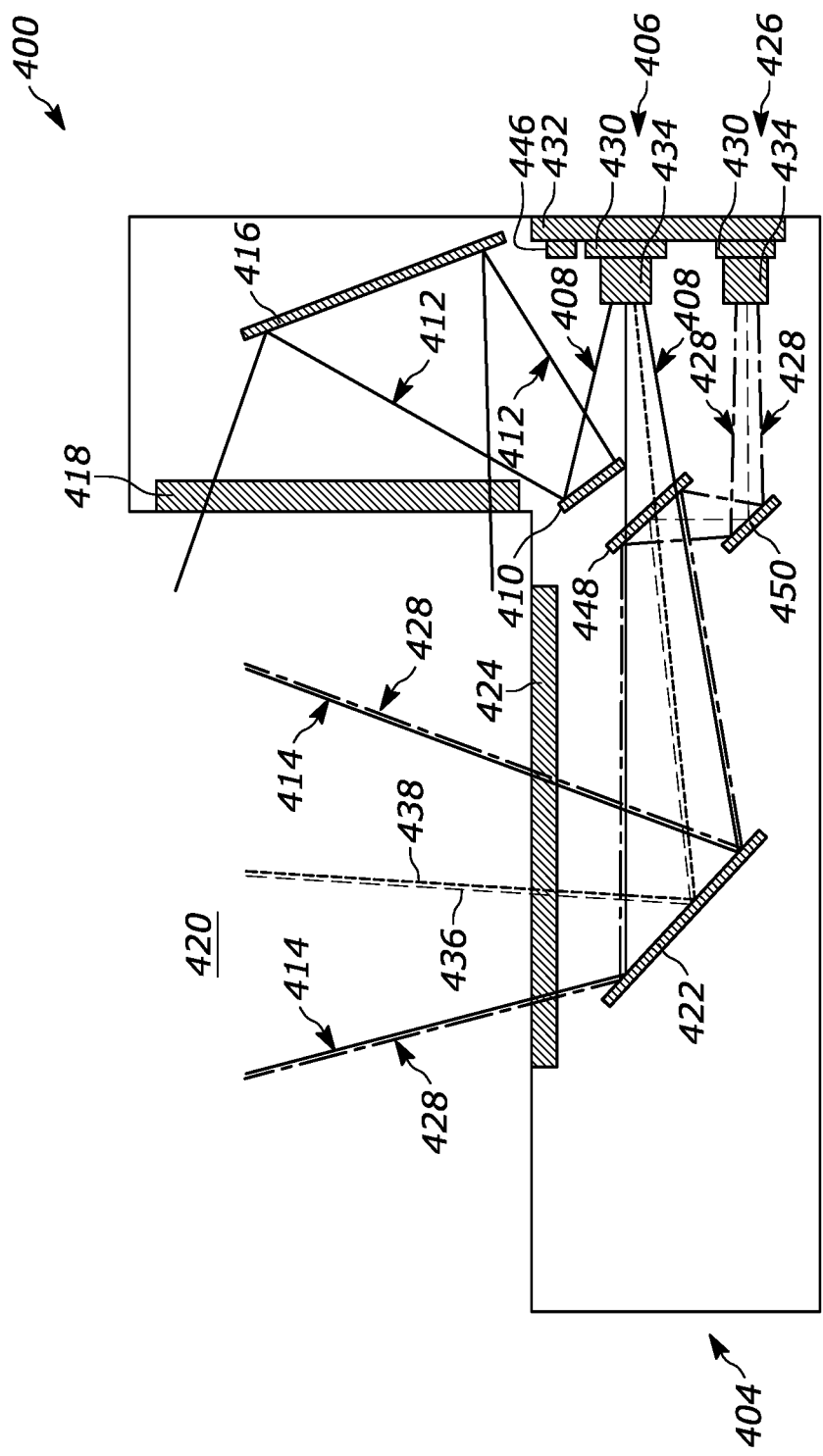
FIG. 9 illustrates a side cross-section block diagram of another example bioptic indicia reader having a dichroic mirror positioned therein.

Another implementation of an indicia reader in accordance with the present disclosure is provided in FIG. 9 which illustrates a cross-section block diagram of an example bi-optic indicia reader. As with other embodiments, features that are same or similar to those previously described use the same reference numerals. In this embodiment, the second imaging assembly 426 is positioned on the same substrate 432 as the first imaging assembly 406. This implementation may be beneficial for various reasons.

For example, positioning the imaging assemblies on the same PCB can lead to reduced complexity and cost. In other cases, this arrangement may provide for greater flexibility in arranging the desired FOVs to overlap in a sufficient manner. This could be due to the spacing constraints in combination with the need to provide an appropriate angle of divergence for each respective FOV. For instance, referring back to FIG. 4, it should be apparent that due to the positioning of the second imaging assembly 426 some distance away from the first imaging assembly 406 and the resulting difference in optical distances from the product scanning region 420 to each respective imaging assembly, it is difficult to obtain FOV configurations where FOV 414 and FOV 428 substantially overlap each other in the product scanning region 420. This can be more easily managed with the embodiment of FIG. 9 where the difference in optical distances from the product scanning region 420 to each respective optical assembly is significantly reduced.

As can be observed, this can be achieved by implementing a mirror arrangement which includes mirrors 448 and 450 strategically positioned within the optical paths of the first imaging assembly 406 and the second optical assembly 426. Specifically, mirror 448 is implemented as a dichroic mirror that is positioned within the path of the first optical assembly 406. Dichroic mirror 448 may share its characteristics with all other dichroic mirrors described herein in that it is operable to pass therethrough light in a first wavelength range (e.g., 700 nm or lower) and reflect light in a second wavelength range (e.g., greater than 700 nm). Positioning dichroic mirror 448 within the path of the first sub-FOV 414 allows light that is received at said mirror from the product scanning region 420 (via the fold mirror 422) to be directionally split. Light that is within the first wavelength range continues along the first sub-FOV 414 toward the first imaging assembly 406 where it is sensed to generate first image data. Light that is within the second wavelength range is reflected by the dichroic mirror 448 towards the second mirror 450. Mirror 450 may be any kind of a mirror so long as it reflects light within the second wavelength range towards the second imaging assembly 426 where it is sensed to generate second image data.

One may observe that positioning the imaging assemblies in near proximity to each other (e.g., on the same circuit board as shown in FIG. 9) in combination with the mirror arrangement of mirrors 448 and 450 allows for FOV 428 and first sub-FOV 414 to substantially overlap in a region that extends beyond the dichroic mirror 448 as the FOVs extend away from the respective imaging assemblies. This can be observed with respect to both the boundaries of the FOVs and their respective central axis 436 and 438. It should be appreciated that while the illustration does not illustrate an exact overlap between the boundaries and central axes of the FOVs 414 and 428, such non-overlap is provided for both exemplary and illustrative purposes. That is, in certain embodiments the FOVs can be arranged such that the boundaries/central axis track relatively near each other and in a substantially parallel manner. In other instances, a substantial overlap may be achieved. However, even in such case small deviations due to manufacturing tolerances may be expected.

Although the foregoing embodiment of FIG. 9 may implement many features of the previously described embodiments of FIGS. 4-7, it will be apparent that fold mirror 422, if utilized, should be operable to reflect light in both the first and second wavelength ranges.

Figure 10:
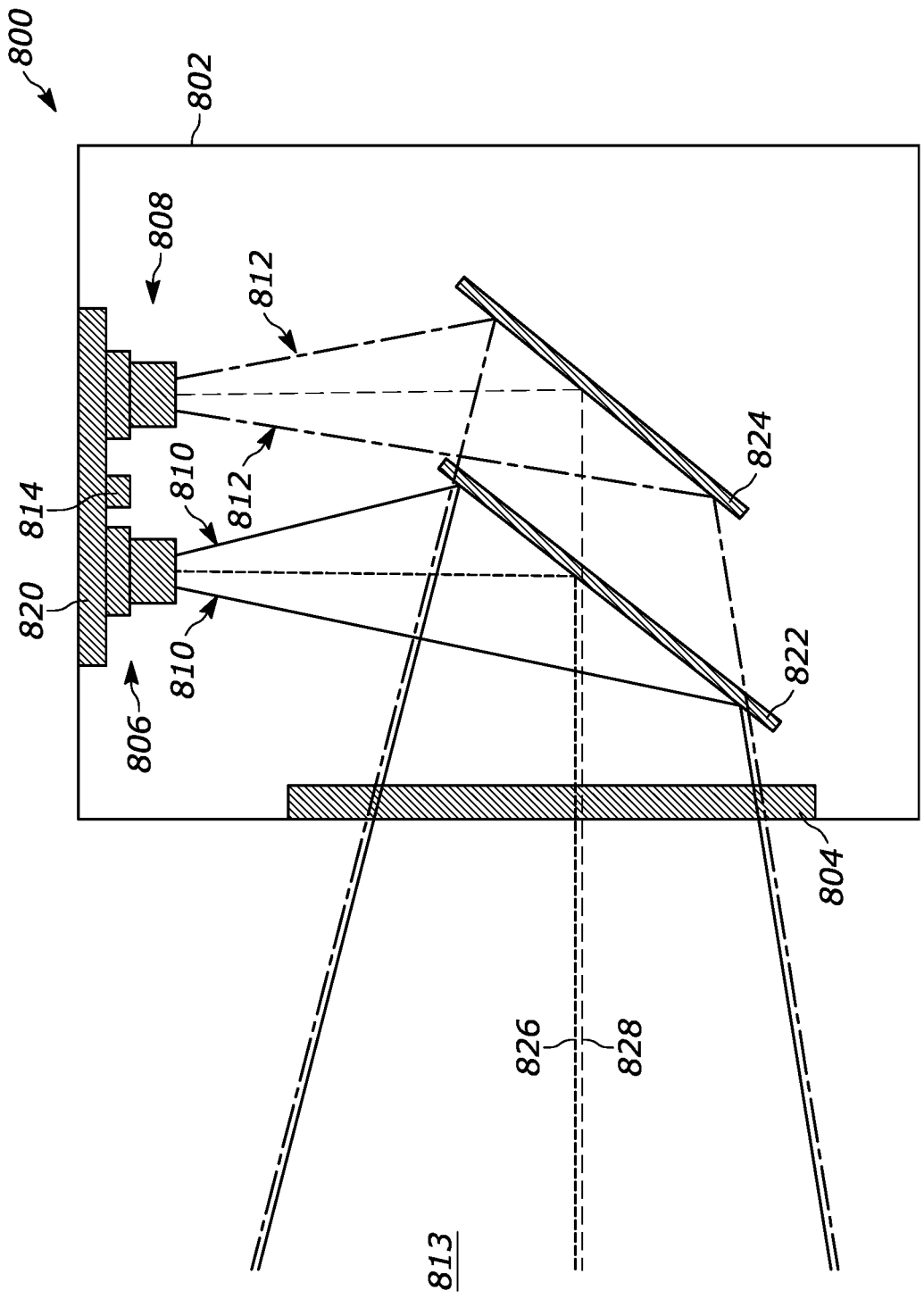
FIG. 10 illustrates a side cross-section block diagram of another example slot indicia reader having a dichroic mirror positioned therein.

Yet another embodiment of an indicia reader is illustrated in FIG. 10 which illustrates a side cross-section block diagram of an example slot indicia reader 800. The reader of FIG. 10 is functionally and structurally similar to that of the slot reader 800 of FIG. 8 and hence features that are same or similar to the prior embodiment use the same reference numerals. However, as with the bi-optic embodiment of FIG. 9, the reader 800 is implemented with both imaging assemblies 806 and 808 being positioned on the same substrate (e.g., PCB) 820.

With this configuration, a mirror arrangement comprising mirrors 822 and 824 are used. Namely, these mirrors are strategically positioned within the optical paths of the first imaging assembly 806 and the second optical assembly 808 with mirror 822 being implemented as a dichroic mirror that is positioned within the path of the first optical assembly 806. Dichroic mirror 822 may share its characteristics with all other dichroic mirrors described herein in that it is operable to reflect light in a first wavelength range (e.g., 700 nm or lower) and pass therethrough light in a second wavelength range (e.g., greater than 700 nm). Positioning dichroic mirror 822 within the path of the FOV 810 allows light that is received at said mirror 822 from the product scanning region 813 to be directionally split. Light that is within the first wavelength range is reflected along the FOV 810 toward the first imaging assembly 806 where it is sensed to generate first image data. Light that is within the second wavelength range is passed through the dichroic mirror 822 towards the second mirror 824. Mirror 824 may be any kind of a mirror so long as it reflects light within the second wavelength range towards the second imaging assembly 808 where it is sensed to generate second image data.

One may observe that positioning the imaging assemblies in near proximity to each other (e.g., on the same circuit board as shown in FIG. 10) in combination with the mirror arrangement of mirrors 822 and 824 allows for FOV 810 and FOV 812 to substantially overlap in a region that extends beyond the dichroic mirror 822 as the FOVs extend away from the respective imaging assemblies. This can be observed with respect to both the boundaries of the FOVs and their respective central axis 826 and 828. It should be appreciated that while the illustration does not illustrate an exact overlap between the boundaries and central axes of the FOVs 826 and 828, such non-overlap is provided for both exemplary and illustrative purposes. That is, in certain embodiments the FOVs can be arranged such that the boundaries/central axis track relatively near each other and in a substantially parallel manner. In other instances, a substantial overlap may be achieved. However, even in such case small deviations due to manufacturing tolerances may be expected.

Additionally, it should be noted that with both embodiments of FIGS. 9 and 10, the imaging assemblies may be configured in any manner that has been described with respect to the prior embodiments of the present disclosure.

For example, the first imaging assembly may be a 2D imaging assembly and the second imaging assembly may be a 3D imaging assembly, or vice versa. Also, one should appreciate that other elements like illumination assemblies, decoder modules, controllers, and/or processors may similarly be implemented. In short, those of ordinary skill in the art will recognize that various elements may be taken from any one embodiment and implemented in any other embodiment. Also, any one of the indicia reader embodiment described herein may also be implemented as a vision system that conducts vision processing on image data gathered from any one of the imaging assemblies without such vision system having the requirement to have indicia decoding operations.

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAS, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. An indicia reader, comprising;
a housing;
a first imaging assembly positioned at least partially within the housing, the first imaging assembly configured to generate first image data representative of a first environment appearing within a field of view (FOV) of the first imaging assembly, the first imaging assembly being one of a two-dimensional (2D) imaging assembly or a three-dimensional (3D) imaging assembly;
a second imaging assembly positioned at least partially within the housing, the second imaging assembly configured to generate second image data representative of a second environment appearing within a FOV of the second imaging assembly, the second imaging assembly being another one of the 2D imaging assembly or the 3D imaging assembly;
a decode module configured to receive one of the first image data or the second image data resulting in decoder-received image data and process the decoder-received image data to determine a payload of at least one indicium present in the decoder-received image data;
a controller communicatively coupled to the decoder module and configured to transmit the payload to a host; and
a mirror arrangement positioned at least partially within the housing, the mirror arrangement configured to redirect light from a product scanning region of the indicia reader to the first imaging assembly, the mirror arrangement including a dichroic mirror configured to reflect light in a first wavelength range and to pass therethrough light in a second wavelength range, the first wavelength range being different from the second wavelength range,
wherein the light in the first wavelength range that is reflected by the dichroic mirror is received, after being reflected by the dichroic mirror, directly or indirectly, by the first imaging assembly and is used to generate the first image data, and
wherein the light in the second wavelength range that passes through the dichroic mirror is received, after passing through the dichroic mirror, directly by the second imaging assembly and is used to generate the second image data.

2. The indicia reader of claim 1, wherein the first imaging assembly is the 2D imaging assembly and the second imaging assembly is the 3D imaging assembly.

3. The indicia reader of claim 2, wherein the dichroic mirror is configured to reflect light below 700 nm and to pass therethrough light above 700 nm.

4. The indicia reader of claim 3, wherein the second imaging assembly is configured to generate second image data responsive to sensing light having a wavelength greater than 900 nm.

5. The indicia reader of claim 2, wherein:
the housing includes (i) a lower housing portion having a first transparent window in a generally horizontal plane and (ii) an upper housing portion having a second transparent window in a generally upright plane;
the dichroic mirror is positioned in the lower housing portion at least partially below the first transparent window; and
at least a portion of the second imaging assembly is positioned below the dichroic mirror relative to the first transparent window.

6. The indicia reader of claim 2, wherein:
the housing includes (i) a lower housing portion having a first transparent window in a generally horizontal plane and (ii) an upper housing portion having a second transparent window in a generally upright plane;
the dichroic mirror is positioned in the upper housing portion at least partially behind the second transparent window; and
at least a portion of the second imaging assembly is positioned behind the dichroic mirror relative to the second transparent window.

7. The indicia reader of claim 2, wherein:
the housing includes a transparent window positioned in a window-side of the housing;
the first imaging assembly includes an imaging sensor having an array of pixels oriented to form a substantially flat surface extending along a plane that is substantially orthogonal to the window-side of the housing;
the dichroic mirror positioned at an oblique angle relative to the window-side of the housing; and
the second imaging assembly positioned behind the dichroic mirror relative to the window.

8. The indicia reader of claim 2, further comprising an illumination assembly configured to provide illumination light within the first wavelength range, the illumination light being directed towards the product scanning region,
wherein the second imaging assembly is configured to generate second image data based on capturing at least one image frame having an exposure period, and
wherein the illumination assembly is further configured to provide the illumination light during at least a portion of the exposure period.

9. The indicia reader of claim 1, wherein the dichroic mirror is an only mirror of the mirror arrangement.

10. The indicia reader of claim 1, wherein the light in the first wavelength range that is reflected by the dichroic mirror is received from the product scanning region along a first central optical axis,
wherein the light in the second wavelength range that passes through the dichroic mirror is received from the product scanning region along a second central optical axis, and
wherein the first central optical axis and the second central optical axis are substantially coaxial.

11. The indicia reader of claim 1, further comprising a processor configured to (i) receive at least two of at least a portion of the first image data, at least a portion of the second image data, or the payload, resulting in processor-received data (ii) execute at least one task on the processor-received data, and (iii) transmit a result of executing the at least one task to another processor.

12. The indicia reader of claim 1, further comprising a printed circuit board, wherein the first imaging assembly and the second imaging assembly are mounted on the printed circuit board.

13. A tangible machine-readable medium comprising instructions that, when executed, cause a machine to at least;
generate first image data representative of a first environment appearing within a field of view (FOV) of a first imaging assembly that is positioned at least partially within a housing, the first imaging assembly being one of a two-dimensional (2D) imaging assembly or a three-dimensional (3D) imaging assembly;
generate second image data representative of a second environment appearing within a FOV of a second imaging assembly that is positioned at least partially within the housing, the second imaging assembly being another one of the 2D imaging assembly or the 3D imaging assembly;
receive, at a decode module, one of the first image data or the second image data resulting in decoder-received image data and process the decoder-received image data to determine a payload of at least one indicium present in the decoder-received image data; and
transmit, via a controller communicatively coupled to the decoder module, the payload to a host,
wherein the machine includes a mirror arrangement positioned at least partially within the housing, the mirror arrangement configured to redirect light from a product scanning region of the machine to the first imaging assembly, the mirror arrangement including a dichroic mirror configured to reflect light in a first wavelength range and to pass therethrough light in a second wavelength range, the first wavelength range being different from the second wavelength range,
wherein the light in the first wavelength range that is reflected by the dichroic mirror is received, after being reflected by the dichroic mirror, directly or indirectly, by the first imaging assembly and is used to generate the first image data,
wherein the light in the second wavelength range that passes through the dichroic mirror is received, after passing through the dichroic mirror, directly by the second imaging assembly and is used to generate the second image data.

14. The tangible machine-readable medium of claim 13 wherein the first imaging assembly is the 2D imaging assembly and the second imaging assembly is the 3D imaging assembly.

15. The tangible machine-readable medium of claim 14, wherein the instructions, when executed, cause the machine to at least provide illumination light, via an illumination assembly, within the first wavelength range towards the product scanning region,
wherein the second imaging assembly generates second image data based on capturing at least one image frame having an exposure period, and
wherein the illumination assembly provides the illumination light during at least a portion of the exposure period.

16. The tangible machine-readable medium of claim 14, wherein the dichroic mirror is configured to reflect light below 700 nm and to pass therethrough light above 700 nm.

17. The tangible machine-readable medium of claim 14, wherein the second imaging assembly generates second image data responsive to sensing light having a wavelength greater than 900 nm.

18. The tangible machine-readable medium of claim 13, wherein the instructions, when executed, cause the machine to at least:
receive, at a processor, at least two of at least a portion of the first image data, at least a portion of the second image data, or the payload, resulting in processor-received data;
execute, at the processor, at least one task on the processor-received data; and
transmit a result of executing the at least one task to another processor.

19. The tangible machine-readable medium of claim 13, wherein the machine wherein the light in the first wavelength range that is reflected by the dichroic mirror is received from the product scanning region along a first central optical axis,
wherein the light in the second wavelength range that passes through the dichroic mirror is received from the product scanning region along a second central optical axis, and
wherein the first central optical axis and the second central optical axis are substantially coaxial.

20. The tangible machine-readable medium of claim 13, wherein the dichroic mirror is an only mirror of the mirror arrangement.

* * * * *